United States Patent [19]

Pinto

[11] 4,132,326

[45] Jan. 2, 1979

[54] MULTIPLE HOOK-UP, MOVABLE AXLE, CONTAINER CARGO TRAILER

[76] Inventor: Robert R. Pinto, 2900 Federal St., Camden, N.J. 08105

[21] Appl. No.: 788,182

[22] Filed: Apr. 18, 1977

[51] Int. Cl.² .................. B60P 1/52; B60P 7/08; B62D 53/08
[52] U.S. Cl. ..................... 214/515; 214/84; 280/80 A; 280/179 A; 280/415 B; 280/423 R; 293/73
[58] Field of Search ............... 280/144, 147, 420, 421, 280/422, 179 R, 179 A, 80 R, 80 A, 423 R, 423 A, 415 B, 405 R, 405 A; 214/84, 515; 293/73, 66; 105/380, 390, 392, 504

[56] References Cited
U.S. PATENT DOCUMENTS

| 2,756,073 | 7/1956 | Bridge | 280/179 R X |
|---|---|---|---|
| 2,962,295 | 11/1960 | Tenebaum | 280/80 B |
| 2,986,408 | 5/1961 | Black | 214/515 X |
| 2,990,212 | 6/1961 | Nicastro | 293/73 X |
| 3,315,617 | 4/1967 | Schwiebert | 280/179 A X |
| 3,410,576 | 11/1968 | Turpen | 280/415 B X |
| 3,428,331 | 2/1969 | Morgan | 280/179 R |
| 3,679,075 | 7/1972 | Guyaux | 214/84 |
| 3,697,045 | 10/1972 | Farley | 280/179 A X |
| 3,709,542 | 1/1973 | Fehlau | 293/73 |
| 4,027,892 | 6/1977 | Parks | 280/179 R |

Primary Examiner—Joseph F. Peters, Jr.
Assistant Examiner—R. Schrecengost
Attorney, Agent, or Firm—Benasutti Associates, Ltd.

[57] ABSTRACT

A novel cargo trailer for carrying containerized loads is disclosed, which can be pulled from either end and comprises a plurality of axles, each of which is movable with respect to the undercarriage of the cargo bed to facilitate multi-directional hauling, better weight distribution, and the storage of a fully loaded trailer without utilizing a landing gear.

9 Claims, 12 Drawing Figures

MULTIPLE HOOK-UP, MOVABLE AXLE, CONTAINER CARGO TRAILER

BACKGROND OF THE INVENTION

The present invention generally relates to trailers which are adapted to be hooked to and pulled by tractors. More particularly, the present invention relates to trailers which are suited for containerized shipments, such as those commonly handled by air cargo and/or sea transporters.

Commercially available trailers have changed only slightly over the last thirty years. Generally these trailers comprise a load bed, a kingpin assembly adapted to be engaged by a tractor, one or more sets of wheels, and various peripheral equipment such as lights, bumpers, etc., particularly as required by the Interstate Commerce Commission. Generally, the load bed of a trailer is designed to facilitate the particular load type to be handled, as for example, a load bed or undercarriage adapted to carry a tank for hauling liquids, a flat bed configuration for hauling items secured thereto, or a van configuration for confining loose loads.

Over the last thirty years, the trend in trailer construction has been to lighten the weight of the trailer while maintaining suitable strength characteristics so that relatively heavier payloads could be accomodated while, nonetheless, meeting the various weight requirements imposed by each state, particularly concerning the weight carried by each axle and the bridging distance permitted between axles. Accordingly, most trailers which have been constructed in recent years have been built with relatively abbreviated understructures disposed in the vicinity of the rear axles, thereby substantially reducing the weight of the understructure while nonetheless providing sufficient support in the axle region to handle most loads. Similarly, the use of "sliders" in connection with these abbreviated understructures has gained widespread acceptance in the industry. These sliders generally allow a double axle assembly supporting the rear of the trailer to be moved relative to the underside of the trailer for a distance of approximately nine feet for a forty foot trailer, so that, depending upon the particular load and state weight requirements, a load may be appropriately balanced between the tractor and trailer. In order to reduce the tread wear, and increase the efficiency of a given trailer when that trailer is being pulled in an empty or partially loaded condition, the industry has also, when appropriate, utilized axles which may be selectively retracted vertically away from the road surface to reduce the number of tires in contact with that surface when that axle is not needed.

In spite of the approaches discussed above, those trailers presently in use are subject to certain drawbacks which result in less efficient load transpotation and higher maintenance and service costs. In particular, virtually all trailers now in use are equipped with landing gears which, during the hauling thereof are folded under the trailer body and which may be lowered to support the front end of the trailer when that end of the trailer is not supported by a tractor. Since the trailers themselves are quite heavy, landing gears are normally powered by variable speed winches which move the landing gears into position. Since landing gears, although vital when needed, are basically superfluous to the operation of each trailer during the hauling of loads, it has not been economic to construct landing gears which are so rugged and durable as to adequately support many trailers in the fully loaded condition. Further, these landing gears are particularly prone to failure or damage during the hook-up operation when a tractor is attempting to back into the trailer to grab the kingpin.

Very recently, the above described problems of cargo shipment have been complicated by the increasing use of containerized shipments, and particularly shipments of containers having dimensions approximately ten or twenty feet long and the full width of a trailer body. While these relatively large containers have gained widespread acceptance in the air and sea transport industries, they have created considerable difficulties for truckers who normally deliver the contents of such containers locally, as for example, to standard loading docks where final unloading of the transported materials is to take place. Conventionally, twenty foot containers are provided with a single set of cargo doors disposed at one end thereof. Accordingly, as a standard procedure, many haulers have adapted twenty foot cargo beds to receive such containers, to buckle those containers to those beds and to transport each container individually to its destination.

While it first appears that a conventional flat bed forty foot long trailer could be adapted to handle two twenty foot trailers, in reality this configuration is not feasible if the contents of each of the containers are to be unloaded while the containers are on the bed, as is normally the case. This results from the fact that cargo access for at least one of the two containers if restricted by door placement and the fact that it is not economical to attempt to unload a twenty foot container from the side, since almost all loading docks are adapted for end loading trailers.

Very recently, one approach which has been taken by Seaboard World Airlines is the provision of two coupleable chassis, each of which is intended to receive a single twenty foot cargo container. Essentially, each chassis is a twenty foot trailer comprising a load bed, landing gear, and axle assembly which is mounted on a sliding sub-chassis. Each of these trailers may be coupled together to be pulled by a single tractor according to the following procedure. A first of the trailers having the container position thereon is appropriately located with the landing gears and struts in the down position while the second trailer is coupled to a tractor and the landing gear put in the up position. The wheels on the second trailer are then locked and the cab moved forward so that the sub-chassis and wheels of the second trailer extend backward beyond the end of the second container. The chassis may be operated in this position or alternatively may be backed into the first trailer so that the kingpin of the first trailer will engage with the locking guides in the extended sub-chassis of the second trailer. The landing gear of the first trailer may then be moved to the up position after which the slider on the second trailer is again released and the entire unit moved forward until the wheels of the second trailer have extended even further into a correct position for a one hundred and twenty inch tandem setting, whereupon the slider of the second trailer is again locked and the slider of the first trailer released and brake set. The entire unit may then move backwards relative to the wheels of the first trailer until the two suspensions automatically unite into a load equalizing tandem wherein the axles of the first and second chassis are adjacent to each other.

As seen from the above description, while the coupleable trailer approach will facilitate the transport of two twenty foot containers by a single tractor, this benefit is achieved at the expense of a relatively elaborate coupling procedure which requires the tractor operator to leave the cabs five times to couple or uncouple one trailer from the other. Additionally, in order to effect delivery of the contents of the containers, it is neccessary to go through the coupling and uncoupling procedure many times in order to facilitate access to each of the containers. Accordingly, although this system has achieved some success, the complexity of this system and its suceptibility to damage, particularly landing gear damage during the coupling and uncoupling operation, has limited somewhat its widespread application in the industry.

SUMMARY OF THE INVENTION

I have invented an improved cargo trailer which may be loaded and unloaded from either end, may be pulled or maneuvered from either end, and which does not incorporate a landing gear or other device apart from the wheels and axles to support the trailer when it is not coupled to a tractor.

In the preferred embodiment, the trailer of the present invention comprises a flat, elongate cargo bed adapted to receive two twenty foot containers end to end thereon. Generally at each end of the cargo bed are coupling locations with kingpins so that a tractor may be attached to pull the trailer in either direction. Spanning substantialy the entire distance beween coupling positions is a single track on which a plurality of axle assemblies are mounted for sliding movement relative to each other as well as with respect to the cargo bed. The need for a landing gear is eliminated since the trailer may be fully supported by the axle assemblies when they are disposed near or at opposite ends of the track.

Accordingly, a primary object of the present invention is the provision of a trailer with superior container cargo handling capabilities.

Another aim of the present invention is the provision of a trailer which is capable of being stored without a tractor and which does not utilize a landing gear.

A further aim of the present invention is the provision of a trailer which can be coupled to a tractor and pulled or maneuvered in either of two directions.

A further aim of the present invention is the provision of a trailer which is particularly adapted for receiving and transporting two twenty foot cargo containers, each of which is disposed for easy cargo access.

These and other objects of the present invention will become apparent from the following more detailed description.

DESCRIPTION OF THE PREFERRED EMBODIMENT

Although specific forms of the invention have been selected for illustration in the drawings, and the following description is drawn in specific terms for the purpose of describing these forms of the invention, this description is not intended to limit the scope of the invention which is defined in the appended claims.

The preferred embodiment of the present invention is a cargo trailer for receiving and transporting cargo laden containers and for storing said containers prior to and during the unloading of the contents of those containers while they are still mounted on the trailer. The preferred embodiment trailer is coupleable with a tractor during hauling, and basically comprises a substantially elongate cargo bed and support means movable between at least an unloading position wherein at lest two spaced apart load bearing portions may independently support said bed and said cargo laden containers, and a transportation position for selectively distributing at least a portion of the weight of said bed and cargo laden containers relatively between said load bearing portions of said support means and relatively onto said trailer for hauling. In the preferred embodiment, the load bearing portions comprise a plurality of axle means relatively slideable with respect to each other and with respect to the cargo bed. Coupling means for receiving a tractor at either end of the elongate bed are provided so that the trailer may be engaged and maneuvered to back either end of the trailer up against a conventional loading dock so that easy access to cargo containers with end mounted access doors is facilitated. In order to insure that these containers are properly positioned for transport and unloading, various means are provided in the preferred embodiment for receiving the containers at least from each end of the elongate bed and for selectively conveying the containers across the bed to their desired positions. For transport and subsequent storage, retaining means are provided for retaining the containers at preselected locations with respect to said bed, which retaining means include various straps, winches and cargo bed pins which provide a convenient and fail safe anchoring of the cargo container on the cargo bed.

The increased axle flexibility provided by the preferred embodiment trailer of the present invention is facilitated in part by a novel pneumatic supply means comprising numerous pneumatic lines with periodically disposed quick disconnects which are easily coupleable to each axle means at any of a variety of positions of that axle means with respect to the cargo bed.

Although nearly symmetrical along its length, the preferred embodiment trailer is differentiated at its ends, particularly with respect to the construction of the coupling means disposed at either end thereof to provide maximum maneuverability while retaining various load carrying characteristics which are particulaly well suited for meeting the bridging, weight, and ICC requirements which regulate travel of such a trailer. In particular, the coupling means at a first "front" end of the trailer is not provided with a bumper of any kind and has a clearance length which is somewhat longer than the clearance length provided for the second coupling means at the "rear" of the trailer. This second "rear"coupling means has an abbreviated clearance length and further comprises a bumper which is pivotally disposed so that it can be swung up and out of the way of the tractor when coupling is to be effected at that end of the tractor. The abbreviated clearance supplied at this second coupling position is sufficient to enable a high degree of maneuvability of the trailer, as for example, into loading docks, while nonetheless facilitating the extension of the track means disposed on the undercarriage of the trailer into a zone which might otherwise be reserved for tractor clearance, thereby facilitating a maximum bridging distance between the tractor and the trailer wheels when the tractor is coupled to the "front" coupling means and the wheels are moved to their positions closest to the "rear" coupling portion.

Figure 1:
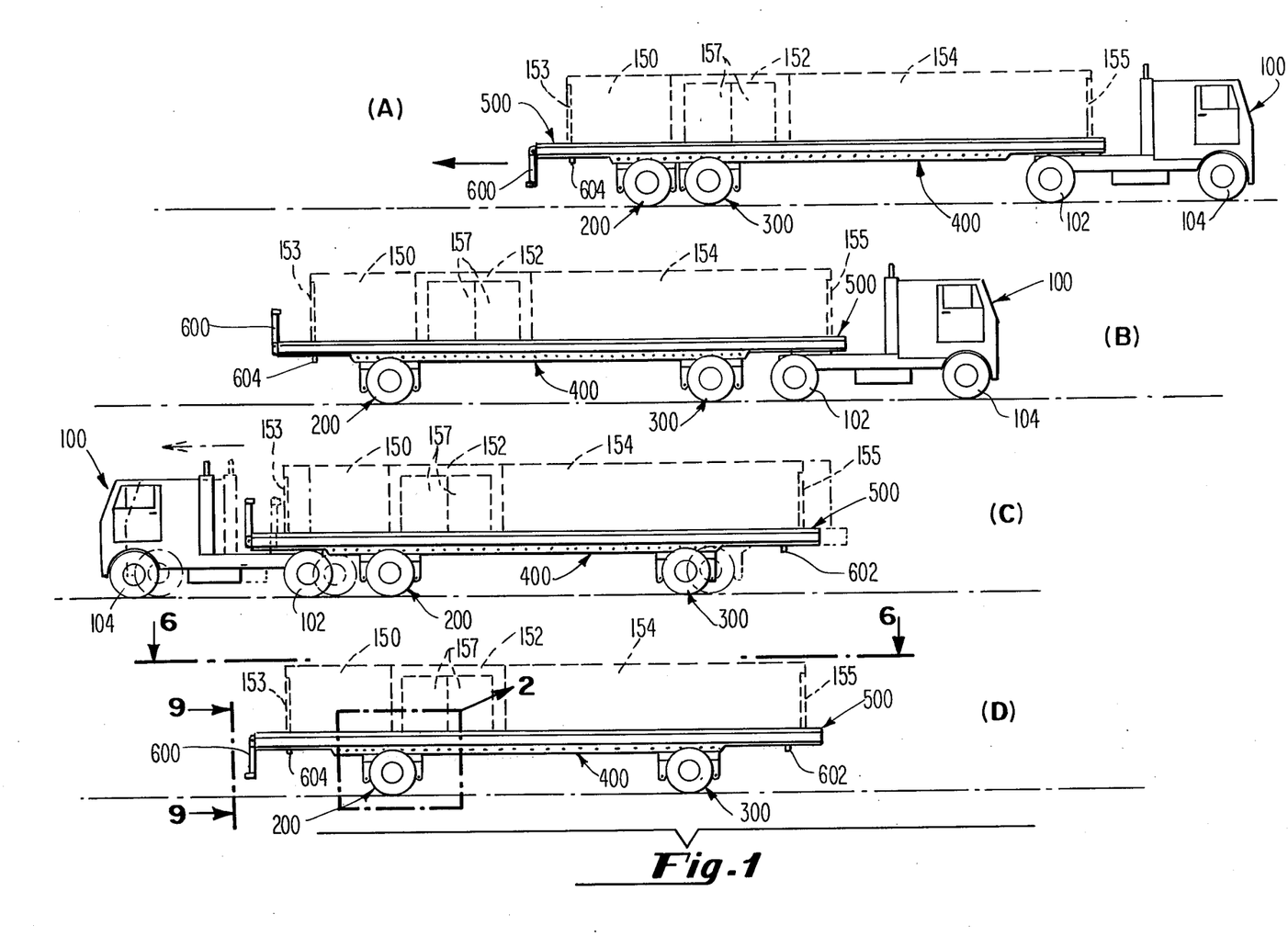
FIG. 1 is a side elevation of the preferred embodiment trailer of the present invention having three cargo containers loaded thereon, wherein the various steps required for differential tractor hook-up, and storage are illustrated.

Referring now to the drawings, FIG. 1 illustrates the preferred embodiment container cargo trailer of the present inventin wherein a tractor designated generally 100 having wheels and axles 102 and 104 is coupled to the "front" end of the preferred embodiment trailer. Disposed on the cargo bed,, designated generally 500 are a plurality of containers 150, 152, and 154. Of these containers containers 150 and 152 are representative of the standard "ten foot" type while container 154 is representative of the "twenty foot∞ type. As seen in the drawings, containers 150 and 154 have doors 153 and 155 which are disposed on the ends thereof, while container 152 has side access doors 157. As seen in FIG. 1, the preferred embodiment trailer of the present invention comprises a cargo bed designated generally 500, a tracking assembly designated generally 400, a coupling assembly, as described above, and support means capable of independently supporting the cargo bed and comprising a plurality of load bearing portions, which in the drawings are illustrated as a plurality of axle means designated generally 200 and designated generally 300 which are relatively slideable with respect to each other and with respect to the cargo bed designated generally 500.

FIG. 1 generally illustrates a number of sequential maneuvers which may be accomplished with the preferred embodiment of the present invention. Referring to FIG. 1a, the tractor 100 is shown coupled to a cargo laden trailer wherein the axle means 200 and 300 are disposed in a hauling position wherein the bridging distance between the axle means and trailer axle 102 is maximized, as may be desired in certain staets stressing long bridge distances. Should it be desired, however, to unload the contents of cargo container 154 onto a loading dock, it is merely necessary to set the brakes on axle means 300, to release that axle means from its engagement from track 400, and for the tractor to drive the trailer in the direction illustrated in the arrow in FIG. 1a until the tractor and trailer assume a position with respect to axle means 300 as illustrated in FIG. 1b where that axle means is locked to track 400. Once in this position, the trailer is fully supported and a tractor 100 may uncouple from trailer kingpin 602 and drive to the other trailer end. Since the bumper 600 has been swung to the up position, it is now possible for the tractor 100 to couple with kingpin 604 by backing into that kingpin in a conventional manner, whereupon the coupling is complete in the position shown in phantom in FIG. 1c. For purposes of convenience and maneuverability, however, it may be desired to reorient axle means 200 with respect to the remaining portion of the trailer, as for example, to redistribute the axle load. In this event, the brake of the axle means 200 is set, the axle means released from the tracking assembly 400 so that it may slide thereacross, and the trailer moved in the direction of the arrows shown in FIG. 1c from the phantom to the solid line position, whereby it may be seen that the axle means 200 has begun to move relatively closer to axle means 300 and along the bed. This movement may, of course, be continued to any desired position.

One of the novel advantages of the present invention is the ability to selectively distribute the weight carried by the cargo bed 500 between the various load bearing portions in any manner which is desirable under the circumstances. In the situation illustrated in FIG. 1, if it is desired, for example, to orient the axles 200 and 300 approximately equi-distant from the respective ends of the cargo bed 500, the movement of that axle is halted in the position shown in solid lines in FIG. 1cwhereupon the axle means may be locked with respect to track 400 and the tractor 100 uncoupled from kingpin 604, and, if desired, the bumper may be swung back into its operative position for safety purposes. As seen in FIG. 1d, in this stored position, the trailer is fully supported by the axle means, no landing gear is required, and since the load is static and the axles built with a substantial safety margin to withstand the increased stresses of a dynamic load, storage of even the heaviest laden trailer is easily accommodated.

Figure 2:
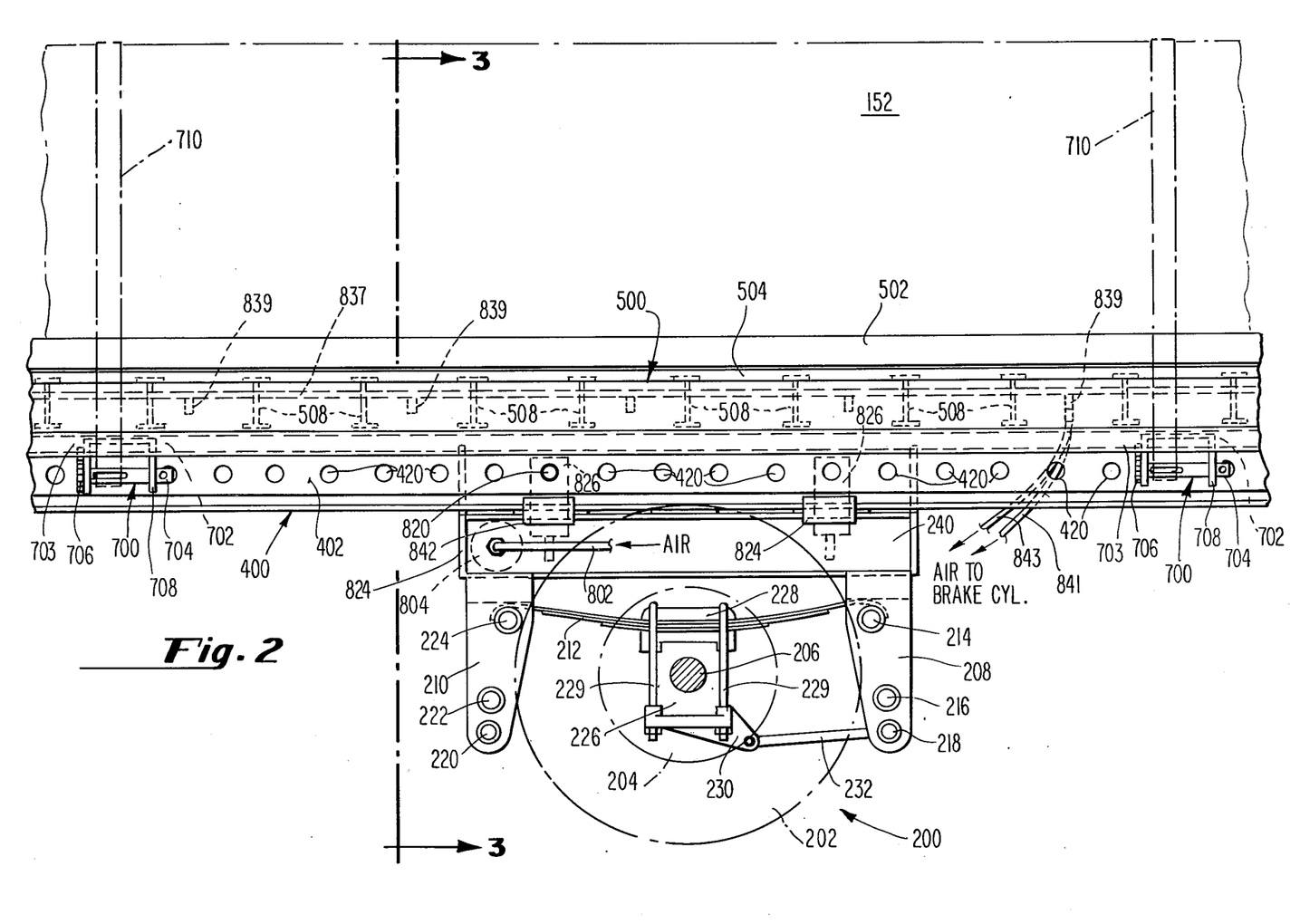
FIG. 2 is a greatly enlarged side view of a portion of the trailer illustrated in FIG. 1d taken as indicated by the lines and arrows 2 in FIG. 1.

The structure and interrelationship of the particular elements of the preferred embodiment are illustrated in FIGS. 2 through 10. Referring in particular to FIG. 2, which is a side view on a greatly enlarged scale of a portion of the cargo bed 500, tracking means 400, and axle means 200 of the preferred embodiment trailer, the interrelationship of these means together with that of the pneumatic supply means and retaining assemblies are shown.

Figure 3:
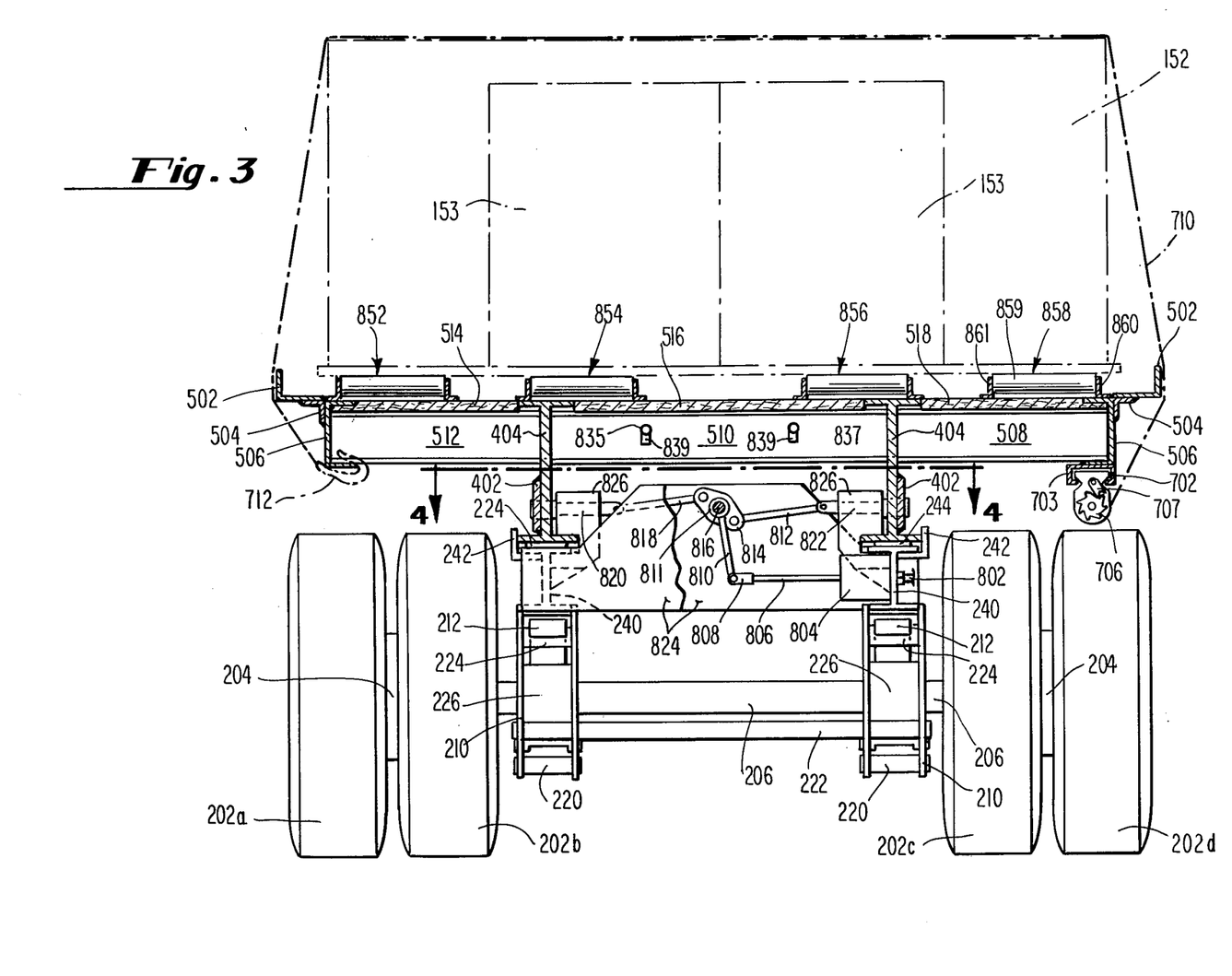
FIG. 3 is a cross-section of the preferred embodiment trailer taken as indicated by the lines and arrows 3—3 in FIG. 2.

The axle means designated generally 200 is seen particularly in FIGS. 2 and 3 to comprise a plurality of rails 240 from which extend a plurality of hanger assembly brackets 208 and 210, between and from which the axle 206 is supported. The hanger assembly brackets 208 and 210 are disposed in pairs under each rail 240, each pair being spaced apart by spacers 220 and 224 for bracket 210 and 218 and 214 for bracket 208. Transverse rods 222 and 216 for brackets 210 and 208 respectively further reinforce the assemblies. Leaf springs 212 extend over and partially around spacers 224 and 214 and are attached thereto. The hub assembly generally comprises leaf spring bracket 228, support and compression rods 229, bearing block 226, stabilizer bar 232, and stabilizer bar casting 230, which together function in a conventional manner. The brakes 204 are conventionally associated with the wheel hubs on which are disposed, for the particular example illustrated in FIGS. 2 and 3, wheels 202a, b, c, and d. Rails 240 are adapted to track under main longitudinal "I"-beams 404 which comprise the main longituinal supports for the cargo bed designated generally 500. The lower portions of "I"-beams 404 have mounted on the exterior vertical surfces thereof reinforcing plates 402 through which plates and "I"-beams 404 are defined a plurality of periodically spaced holes 420, which are adapted to receive locking pins 820 and 822, as will be described more fully hereinafter. In order to facilitate the easy sliding of "I"-beams 404 over rails 240, a thin elongated strip of solid lubricating material 244 is interposed therebetween and attached to rails 240 for sliding movement therewith. The alignment of the axle means 200 with respect to main "I"-beams 404 is insured by guide brackets 242 as shown in the drawings, which are attached to rails 240 and which slide along the exterior surface of the bottom cross-portions of "I"-beams 404. Disposed generally towards the interior of "I"-beams 404 are a plurality of hollow channel brackets 826, which are similarly attached to the complementally disposed interior surfaces of rails 240 and extend around and over the lower cross-portions of "I"-beams 404 so that only relative longitudinal movement between "I"-beams 404 and rails 240 is possible.

In accordance with the preferred embodiment of the present invention, each axle means may be selectively positioned along the track means at any point along that track means. Accordingly, the track means has holes 420 centered at distances of, for example, every four inches, so that activation of the locking assembly may lock the various axle means in virtually any of a variety of preselected positions relative to each other and to the cargo bed therealong.

Figure 4:
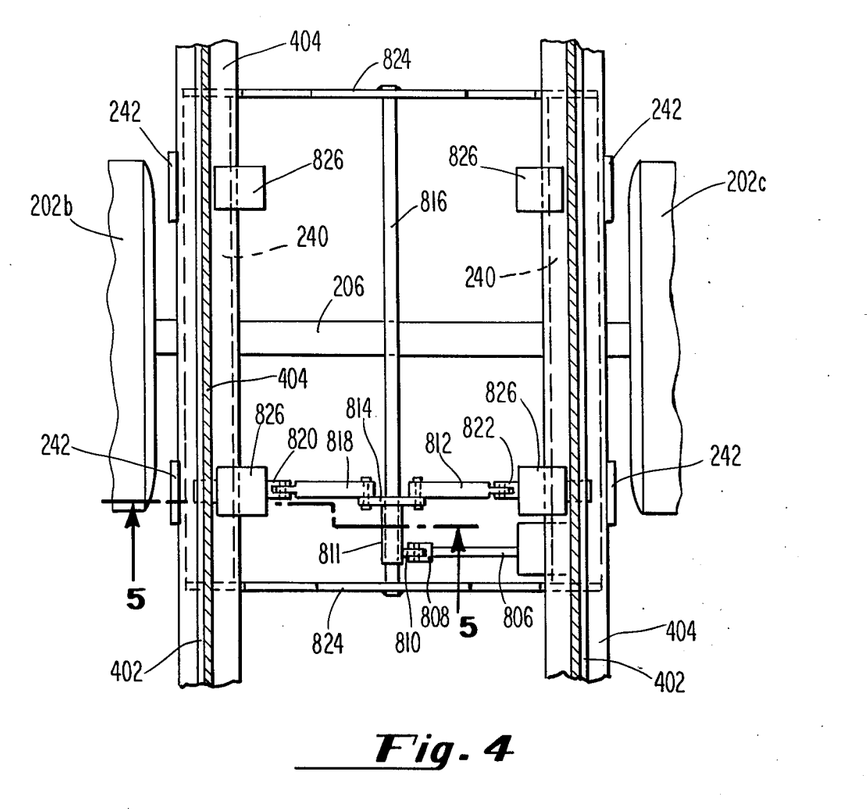
FIG. 4 is a cross-section of a portion of the preferred embodiment trailer of the present invention taken as indicated by the lines and arrows 4—4 in FIG. 3.
Figure 5:
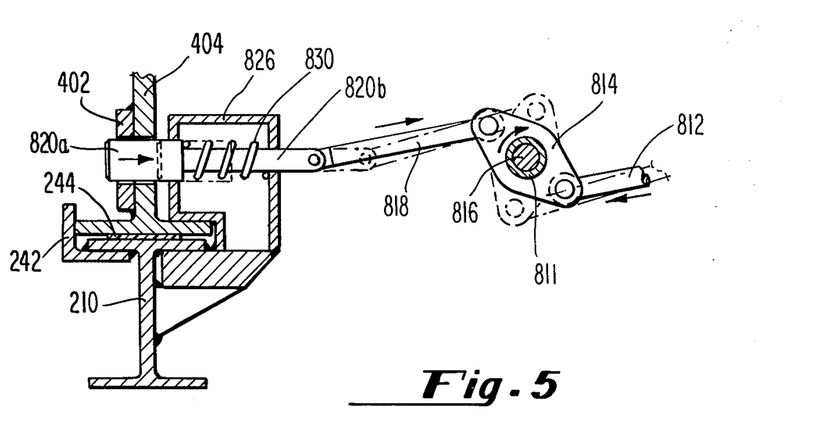
FIG. 5 is a greatly enlarged partial cross-section of a portion of the tracking assembly illustrated in FIG. 4, taken as indicated by the lines and arrows 5—5 in FIG. 4.

Referring now in particular to FIGS. 3, 4, and 5, the locking means for locking the axle means with respect to the track means is illustrated and may be seen to comprise a central axle 816 which is disposed between reinforcing partitions 824 which are welded or otherwise fixed to the ends of rails 240. A bushing 811 is disposed around a portion of the axle and has a protrusion 810 formed thereon which is adapted to couple through collar 808 to rod 806 which in turn is the cylinder rod or may otherwise be powered by cylinder 804. As seen in FIG. 2, cylinder 804 is preferably a pneumatic cylinder supplied by pneumatic line 802 so that activation of the cylinder rod 806 causes the bushing 811 to rotate to withdraw the pins 820 from within the bores formed in reinforcing plate 402 and "I"-beam 404. Referring in particular to FIG. 5, the bushing 811 is attached to a cam member 814, which is pivotally attached to connecting rods 812 and 818. In FIG. 5, the cross-section of the racket and pin housing 826 is illustrated, wherein it is shown that a spring 830 is located around a portion of the pin 820b to bias the pin into the track to insure that, in the absence of a force supplied through rod 806, that the axle means will nonetheless engage the track means. Accordingly, the spring 830 biases the tip portion of the pin 820a generally to the left as seen in FIG. 5 so that upon extension of rod 806, the assembly is caused to move in the direction shown in the arrows in FIG. 5 to the phantom position illustrated in that figure.

In addition to the main longitudinal "I"-beams 404 described above, the cargo bed designated generally 500 of the preferred embodiment trailer comprises a plurality of transverse beams 508, 510 and 512, which generally extend away from "I"-beams 404 and on which flooring 514, 516, and 518, such as conventional oak or maple flooring is secured. Alternatively, single transverse beams may extend through main support beams 404, if desired. The sides of the trailer are finished with "C"-bracket members 506 which are attached to the cross members. In order to prevent the containers which have been loaded on the trailer from sliding off the side of the trailer, cargo retaining angle irons 502 are disposed in the manner shown in FIG. 3 and are attached to "C"-members 506 by supporting angle membes 504. As seen in FIG. 3, this facilitates the reception of cargo containers, which are as wide as the effective structural width of the trailer cargo bed. Extending longitudinally down the center of the trailer are a plurality of pneumatic lines 835 and 837, which are periodically fitted, as for example, every several feet, with quick disconnects 839 which may easily be manually snapped to pneumatic supply conduits 841 and 843 which may service, for example, the air brakes.

As described above, it is particularly important to facilitate the easy loading of cargo laden containers on the trailer of the present invention and, once in place, to secure the containers in the preferred positions. Accordingly, a channel track 702 having winches designated generally 700 sliding therein for longitudinal movement along the cargo bed is provided. These winches, which basically comprise a ratchet 707 and gear 706 assembly for driving shaft 704 are adapted for easy movement along one side of the trailer to particular sites where straps or cords 710 which are wrapped therearound, may be easily located so that side loading doors, such as those disposed in cargo container 152, will not be unduly interfered with. The cords have hooks 712 thereon so that "C"-member 506 may be hooked by the straps 710 and the cargo strapped down by tightening the winch to pull the straps 710 taught.

Figure 12:
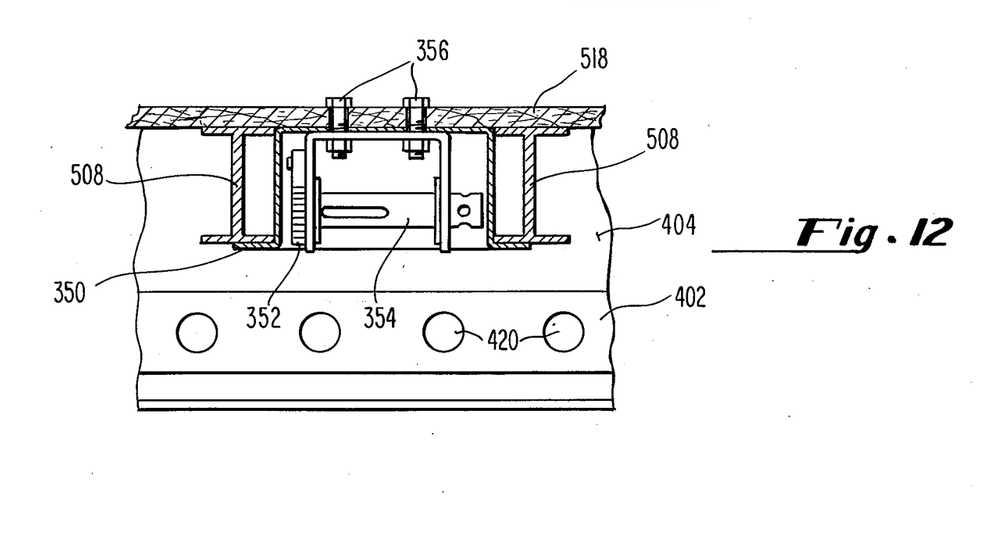
FIG. 12 is a greatly enlarged alternate embodiment, high wheel clearance, winch shown in its preferred recessed mounting under a cut away portion of the cargo bed of a trailer, similar to the cargo bed illustrated in FIG. 2.

Referring now in particular to FIG. 12, it may be seen that in the vicinity of the wheels and at the coupling portions, that is, near the kingpins 602 and 604, a winch extending generally downwardly from "C"-members 506 towards whatever structure, such as the wheels, which may be disposed therebelow may not be desired. Accordingly, FIG. 12 discloses a preferred embodiment recessed winch, which is bolted directly to floor 518 and which has been neatly fitted between transverse members 508, generally on the exterior side of main "I"-beam 404. This winch, which comprises a protective well-type housing is seen to be fitted with its main bracket bolted by bolts 356 directly to the flooring while gear 352 and shaft 354 of the winch are free to function as aforesaid but without the aforesaid clearance difficulties.

Figures 6, 7, 8:
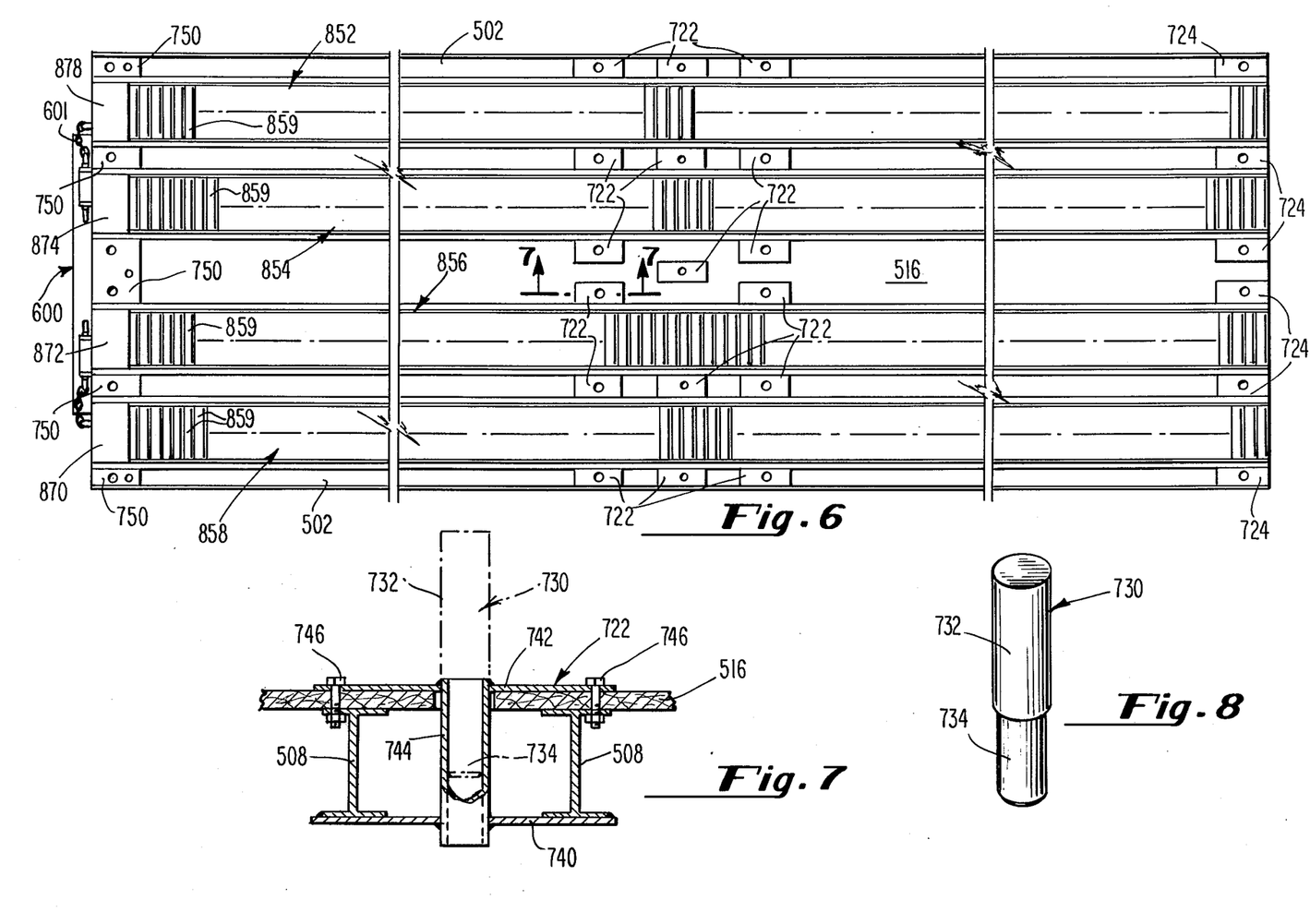
FIG. 6 is an enlarged top view of the preferred embodiment trailer of the present invention, taken as indicated by the lines and arrows 6—6 in FIG. 1.
FIG. 7 is a greatly enlarged cross-section of a portion of the cargo bed of the trailer illustrated in FIG. 6 taken as indicated by the lines and arrows 7—7 in FIG. 6.
FIG. 8 is a perspective view of the pin illustrated in phantom in FIG. 7.

Disposed in parallel spaced apart fashion longitudinally along the cargo bed are a plurality of conveyor tracks designated generally 852, 854, 856, and 858, which facilitate the easy longitudinal movement of large containers into their appropriate transport positions. Once in position, the containers may be prevented from further movement across the conveyors by means of placing pins 730 into appropriately spaced wells which have been mounted in the cargo bed floor generally between the roller conveyors 852, 854, 856, and 858. Referring in particular to FIGS. 6, 7, and 8, the interrelationship of these wells designated generally 722, 724, and 750 and the cargo bed is clearly illustrated. After the cargo container is moved into the appropriate position, either by utilizing a block and tackle, powered roller conveyors, winches, etc., pins such as the pin designated generally 730 in FIG. 8 having generally concentric cylindrical portions, a larger cylindrical portion 732 disposed coaxially with a smaller cylindrical portion 734, are dropped into bores formed in the wells, as for example well 722 illustrated in FIG. 7. In order to insure that each of these wells withstand the stresses, and particularly the torque applied thereagainst by the containers, each well comprises a tube portion 744 for receiving cylindrical portion 734 of the pin, which tube is welded near its ends to top plate 742 and base plate 740 respectively, each of which plates are firmly attached to transverse "I"-beams 508. In the case of base plate 740, all that is necessary is welding of the plate to the appropriate portions of the "I"-beam 508. In the instance of the top plates 742 bolts 746 are disposed through the flooring material 516 into the "I"-beam member to insure that each well becomes a part of the supporting structure of the cargo bed. As seen in FIG. 6, wells 724 and 750 are generally disposed at opposing ends of the cargo bed and pins of various sizes and spacings so that various cargo container configurations may be easily accommodated. Similarly, at other places on the trailer, and particulary centrally disposed thereon, are wells 722 also disposed in the channels formed between the roller conveyor members and which are also suitably spaced to handle varying load sizes.

Figure 9:
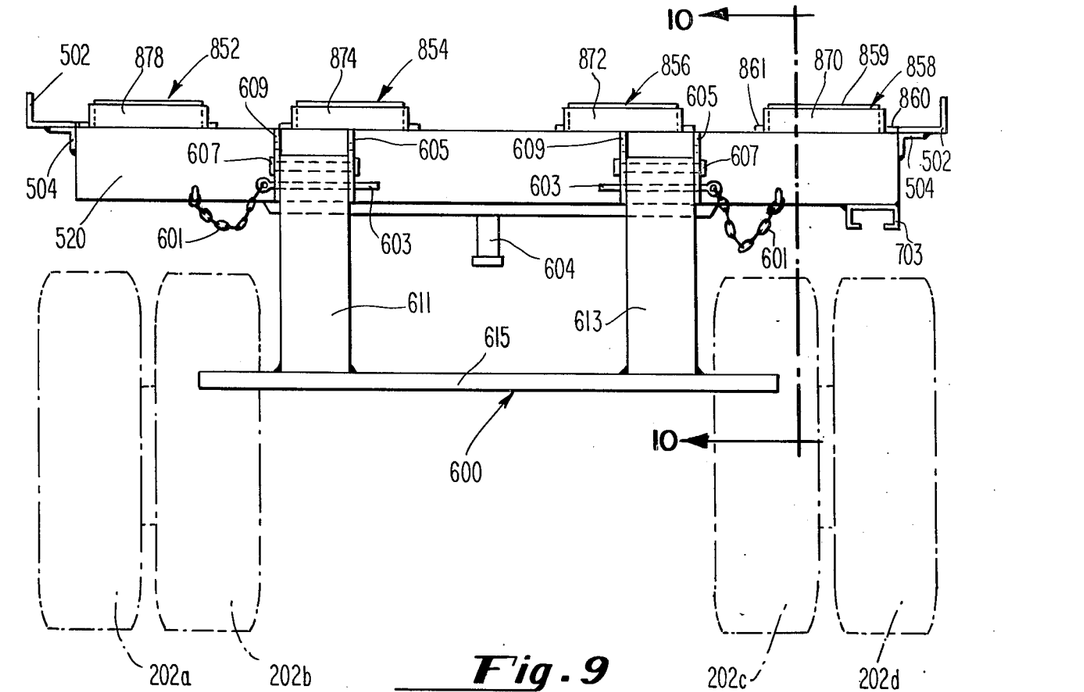
FIG. 9 is an end view of the preferred embodiment trailer, taken as indicated by the lines and arrows 9—9 in FIG. 1.
Figure 10:
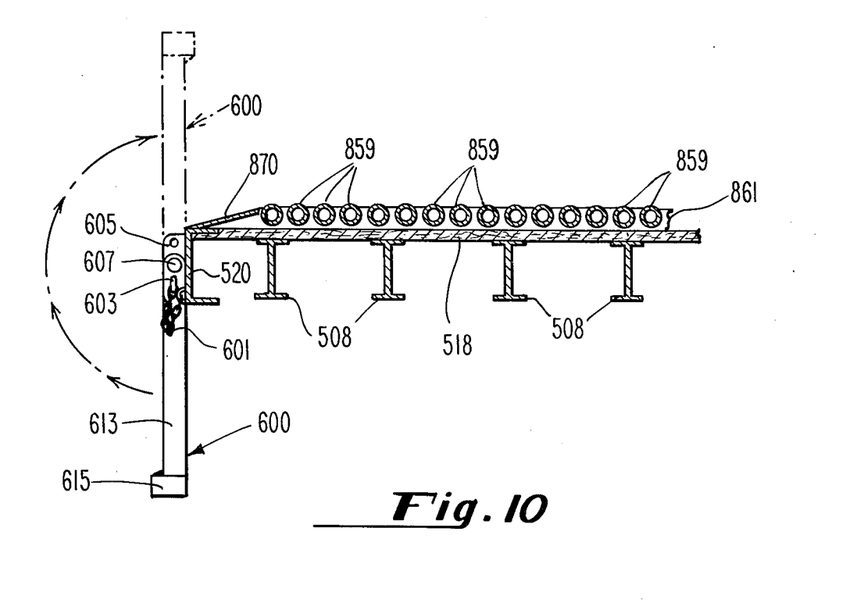
FIG. 10 is a cross-section of a portion of the cargo bed and bumper portion of the trailer, taken as indicated by the lines and arrows 10—10 in FIG. 9.

As mentioned above, the preferred embodiment trailer of the present invention is equipped with a pivotally disposed bumper designated generally 600 which is particularly well illustrated in FIGS. 6, 9, and 10 of the drawings. Referring to FIG. 9, the bumper is seen to comprise two substantially vertical members 611 and 613 which may, for example, have U-shaped cross-sections and which are welded at their ends remote from the cargo bed to transverse bumper member 615. The bumper assembly formed thereby is pivotally mounted on a pair of bumper brackets formed by plates 506 and 509 extending generally outwardly from C-shaped end member 520, which pivotal movement is facilitated by bolts or hinge pins 607. Locking rods 603 attached to chains 601 are provided. Two sets of bores through plates 605 and 609 are provided so that in either the down or the up position as illustrated in FIG. 10, the rods 603 will prevent unwanted movement of the bumper 600. As seen in FIG. 9, the bumper 600 must be pivoted to the up position in order to facilitate proper access to kingpin 604 for coupling with the tractor.

In FIGS. 6 and 10, ramps 870, 872, 874, and 878 are illustrated which facilitate the easy reception of containers and which may guide the container up across rollers 859 of the roller conveyor. If desired, such ramps may be placed at either end of the trailer depending upon the normal container loading condition which is expected. In any event, the roller conveyor tracks 852, 854, 856, and 879 should be bolted to the floor, as for example, through roller conveyor angle brackets 860 and 861 in order to facilitate convenient movement of cargo thereacross.

Figure 11:
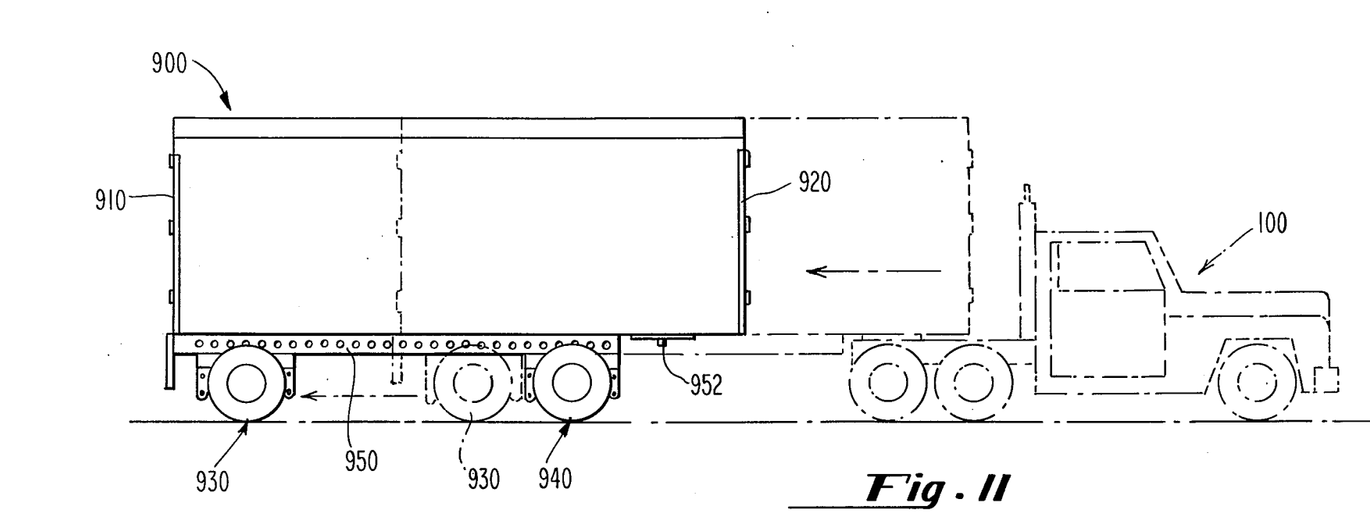
FIG. 11 is an alternate embodiment van trailer wherein the storage position of the trailer is shown, a hauling position of that trailer being shown in combination with a tractor in phantom.

Referring now to FIG. 11 which illustrates an alternate embodiment van trailer of the present invention, it will be seen that certain elements of the present invention may be adapted for use in more conventional contexts than that of an air cargo trailer. As mentioned above, one of the problems encountered by most trailers making interstate shipments is that the bridging, i.e., distance between axles and weight requirements per axle differ from state to state. In the van, designated generally 900, shown in FIG. 11 a track 950 is shown adapted to a van body having doors 910 and 920 disposed at either end thereof. A plurality of axle means 930 and 940 are disposed on a track 950, as described above. One hauling position of these axle means is illustrated in the phantom position shown in FIG. 11, and it is anticipated that in this particular arrangement where heavy loads are to be accommodated or where local regulations vary from state to state, that compliance with these regulations involves merely the selective disengagement of the particular axle means for the track to create a sliding relationship therebetween, the locking or braking of the axle means to be moved, and the movement of the rest of the trailer with respect thereto to reposition the axle means, as described aforesaid. In FIG. 11, however, instead of repositioning axle means 940 for weight distribution or bridging purposes, axle 940 has been disengaged from the track means for sliding, and the wheel locked so that when the tractor and remaining portion of the trailer assembly are moved as shown in FIG. 11, the axle means 840 will slide to the front of the track 950, whereupon the tractor 100 may be disengaged from kingpin assembly 952 to allow the van to be stored, as shown in the solid line drawing in FIG. 11.

As seen from the above description, the trailer of the present invention may be constructed at a low cost, is relatively simple from a mechanical standpoint, provides superior load handling and storage characteristics while at the same time, obviating any necessity for any landing gear. The preferred embodiment trailer of the present invention eliminates the need for several individual smaller trailers which have been heretofore required to deliver large containers having end loading access doors, and further dispenses with any complex assemblies for simultaneously hauling two or more trailers, as heretofore required, in a tandem or coupled fashion.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A cargo trailer for receiving, positioning, retaining and transporting cargo laden containers, said trailer being coupleable with a tractor at least during the hauling thereof, said trailer comprising: a substantially elongate cargo bed, and a pluraliy of axle means relatively slidable with respect to said bed between at least a stored position for independently supporting said cargo bed and any of a variety of preselected transport positions for selectively distributing at least a portion of the weight of said bed and cargo thereon relatively between each of said axle means and relatively onto said trailer for hauling, said plurality of axle means being relatively slidable with respect to each other, as well as with respect to said bed, said trailer further comprising a plurality of means, at least one at each end of said bed, for coupling with said tractor, said means defining coupling positions at each end of said bed having kingpins disposed therein mounted to the undersurface of said bed, said bed further comprising track means disposed along the undersurface of said bed spanning between said coupling positions and terminating at said coupling positions to define first and second tractor clearance lengths in the vicinities of said kingpins between the ends of said track means and the ends of said elongate bed, said first of said tractor clearance lengths disposed at a first end of said elongate bed being relatively longer than the second of said tractor clearance lengths, whereby differential maximum bridging distances may be obtained depending upon the kingpin selected for coupling to said tractor.

2. The invention of claim 1 wherein said trailer further comprises means for receiving said containers from at least each end of said elongate bed.

3. The invention of claim 2 wherein said trailer further comprises means for selectively conveying said containers across said bed, and for retaining said containers at preselected locations with respect to said bed.

4. The invention of claim 1 wherein said bed further comprises pneumatic supply means disposed along said track means for interconnecting at periodic, spaced apart positions along said track means, with flexible conduits associated with said axle means, whereby said axle means may be pneumatically supplied at any position of said means along said track means.

5. The invention of claim 4 wherein said pneumatic supply means comprises at least one main supply conduit extending along said track means and a plurality of quick disconnects connected thereto at periodic, spaced apart positions along said main supply conduit.

6. The invention of claim 3 wherein said means for selective conveyance further comprises a plurality of parallel roller tracks disposed longitudinally across said bed.

7. The invention of claim 3 wherein said means for retaining said containers with respect to said bed comprises:
 (i) a plurality of periodically spaced wells disposed in said bed; and
 (ii) a plurality of retaining pins configured to mate within said wells and to protrude above said bed to selectively prevent movement of said containers across said bed.

8. The invention of claim 7 wherein said means for retaining said containers further comprises:
 (i) a plurality of winches, at least one of which is slidable mounted with respect to said bed;
 (ii) a plurality of straps, at least one for each winch; and
 (iii) a plurality of periodically mounted hooks disposed on said straps for engaging said bed, whereby any of a variety of container sizes may be secured to said bed.

9. The invention of claim 1 wherein said coupling means further comprises a single bumper pivotally mounted to said bed adjacent to said coupling position having said second tractor clearance length.

* * * * *